INVENTOR.
Harmon M. Garfinkel
BY
ATTORNEY

United States Patent Office 3,711,393
Patented Jan. 16, 1973

3,711,393
PURIFICATION OF A MOLTEN SALT BATH
Harmon M. Garfinkel, Horseheads, N.Y., assignor to Corning Glass Works, Corning, N.Y.
Filed Dec. 15, 1969, Ser. No. 884,829
Int. Cl. B01d 13/02
U.S. Cl. 204—180 R                              4 Claims

ABSTRACT OF THE DISCLOSURE

This invention relates to a method of purifying a molten salt bath containing a small amount of a monovalent ion as an impurity, and to an electrolytic system for use in carrying out the method. The invention finds particular application as an improvement in known methods of modifying a glass surface by exchanging sodium ions from the glass surface with potassium ions from a molten salt math, and is described with special reference to such specific application.

---

Figure 1:
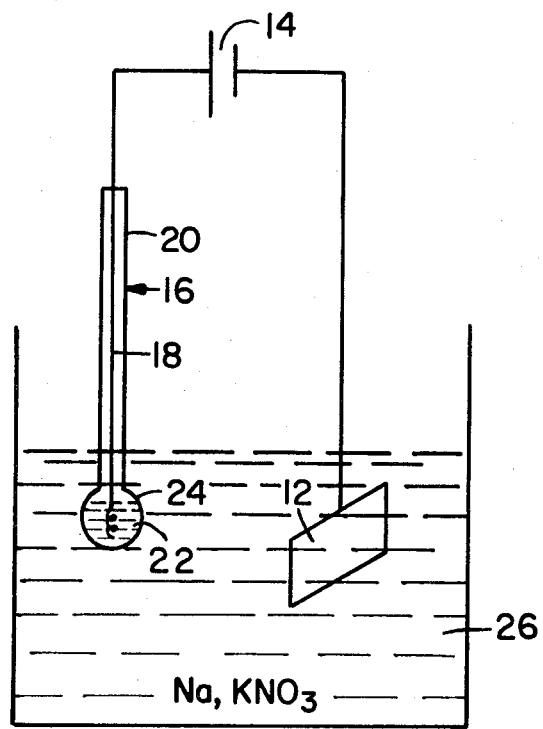

Molten salt baths are widely used in a variety of industrial processes. Such a molten bath may be composed of a single metal salt, but it is common practice to employ a mixture of salts of a given metal, or of different metals, in order to modify the characteristics of the bath, in particular the melting point. As used herein then, a molten potassium salt bath contemplates a bath composed of a single potassium salt, e.g. potassium nitrate, a mixture of potassium salts, e.g. potassium nitrate and chloride, or a mixture of different metal salts, e.g. potassium, and calcium nitrates. Therefore, the concept of impurity is used in a limited sense, for example sodium ions as an impurity in a molten salt bath composed of, or containing as its predominant or active component, a potassium salt.

There has recently been practiced a chemical method of strengthening an alkali metal oxide containing glass article by exchanging large monovalent ions from a salt bath with smaller alkali metal ions within a surface layer on the article. The ion exchange creates compressive stresses within the surface layer on the article, providing it is carried out at a temperature sufficiently low that the stresses are not released by glass rearrangement or flow. Customarily, temperatures below the strain point of the glass are employed to insure against substantial stress release. This low temperature, ion exchange process of chemically strengthening glass articles is further described in British patent specifications Nos. 917,-388 and No. 966,733.

The ion exchange process described above customarily involves immersing a glass article in, or otherwise contacting the surface of the article with, a molten salt bath, e.g. a potassium salt bath. During the ion exchange, the replaced ion from the glass enters the salt bath as an impurity. It has previously been recognized that the ion exchange process, and the physical properties developed thereby, are adversely influenced by a gradually increasing concentration of the replaced smaller ion in the salt bath as the ion exchange process continues. Accordingly, salt bath additives have been proposed as a means of counteratcing this adverse influence. For example, a variety of additives, primarily alkali metal silicates, is disclosed in U.S. Pat. No. 3,441,398.

It is a primary purpose of the present invention to provide for the removal if ion impurities from a molten salt bath without the use of additives to the salt bath. A further purpose is to provide a purification process that may be carried on continuously to maintain ion impurity at a relatively low level without interrupting or interfering with the primary function of the salt bath, such as the ion exchange strengthening treatment of glass surfaces. A still further purpose is to provide an efficient, convenient method of improving a low temperature, ion exchange process of chemically strengthening glass.

The invention is a method of purifying a molten salt bath containing a small amount of a monovalent ion as an impurity, the method comprising removing the impurity ion from the bath by electrolyzing it into a glass membrane having an ion mobility for the impurity ion that is substantially greater than that for the primary ion of the bath. Preferably, the ratio of these mobilities is at least 500 and the glass has an electrical conductivity of at least $10^{-4}$ ohm$^{-1}$ cm.$^{-1}$ at 500° C. The invention further resides in an electrolytic system for carrying out such method comprising an anode, a cathode enclosed within a glass membrane having a substantially greater ion mobility for the impurity ion, and a source of direct current.

Figure 2:
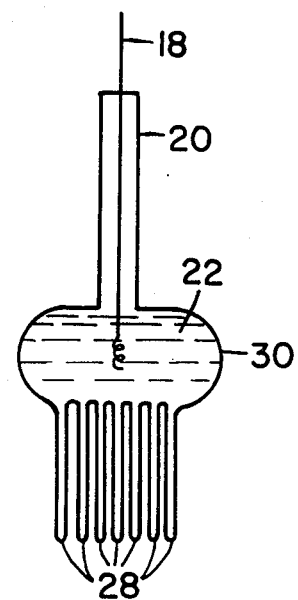
Figure 3:
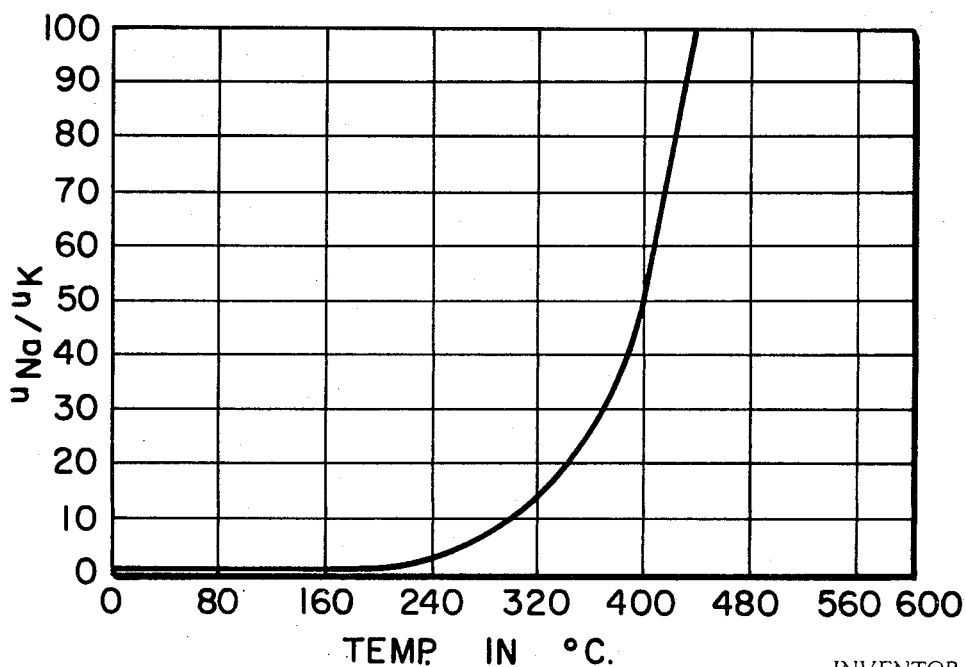

The invention is further described with reference to the accompanying drawings wherein, FIG. 1 is a schematic diagram of an electrolytic system in accordance with the invention, FIG. 2 is an enlarged view of a particularly suitable glass membrane for use in the invention, and FIG. 3 is a graphical illustration of the relationship between ion mobilities and temperature in a borosilicate glass.

The electrolytic system schematically illustrated in FIG. 1 is essentially composed of an anode 12 and a cathode 16 connected to a direct current source 14. Both anode 12 and cathode 16 extend into a potassium nitrate ($KNO_3$) salt bath 26 containing contaminating sodium ions.

Anode 12 may take any conventional form and be composed of any conventional anode material that is capable of withstanding the elevated temperature at which the salt bath operates and that is resistant to chemical attack by such molten salt. For these reasons, platinum foil has been found to be a particularly suitable form of anode.

Current source 14 may be any convenient source of direct current capable of providing a controlled current flow for the process.

As illustrated, cathode 16 is composed of an electrical conductor 18 inserted through a protective silica glass tube 20 and terminating within an electrolyte 22 contained within a glass membrane 24. A particularly suitable cathode is the conventional silver chloride type where the electrolyte is sliver chloride and the conductor is silver wire. In this cathode, the electrolyte may also be a mixture of silver and sodium chlorides, silver nitrate, or a mixture of silver and sodium nitrates, depending on the temperature of the bath.

In other cases a platinum wire or other form of electrical conductor may be employed. As an alternative electrolyte, such other known electrolytes as molten tin or carbon may be employed. The primary function of the electrolyte is to serve as an electrical bridge and to reduce sodium ions diffusing through the glass membrane into the cathode.

Sodium ions diffusing into the cathode from the glass membrane are reduced to sodium metal by, and may amalgamate or otherwise combine with, the electrolyte material employed. Consequently, it is necessary to periodically replace cathode 16. However, depending on the particular material employed as an electrolyte, this material may be recovered in accordance with known commercial treatments.

A particular feature of the invention is glass membrane 24. This is shown as a spherical bulb attached to, and opening into, the end of protective tube 20 and immersed in salt bath 26. Direct current passes through the salt bath between anode 12 and cathode 16 by means of ion transfer. It is readily apparent that both potassium and sodium ions are available to carry the current, but that the potassium ions are available in disproportionate amount.

The present invention is founded on the discoveries that certain glasses have a very high selectivity for sodium ion transfer, relative to potassium ion transfer, and that this selectivity may be so high that sodium ions can be selectively removed in spite of the small concentration. This selective ion transfer may be measured in terms of relative ionic mobility. For purposes of the present invention then, it is highly desirable that membrane 24 be composed of a glass in which the ionic mobility of sodium is at least 500 relative to that of potassium at a given operating temperature, for example 500° C.

The present invention is further founded on the discovery that the selectivity for sodium ion transfer, that is, the ratio of sodium ion mobility to that of potassium ions, increases markedly with temperature. This strongly favors sodium ion removal at the molten bath temperature employed in the ion exchange process. For example, such processes are customarily carried out at temperatures on the order of 500–600° C. where the selectivity of sodium ion transfer may be as much as two magnitudes greater than at room temperature. This is illustrated later with reference to FIG. 3.

It is obviously necessary that the glass used for membrane 24 have a relatively high conductivity, and it is particularly desirable for such glasses to have a conductivity of at least $10^{-4}$ ohm$^{-1}$cm.$^1$ at 500° C. A further factor in achieving the desired electrical conductivity is provision of a physical form of membrane providing a large surface area. While a spherical construction as shown in FIG. 1 is operative, it is ordinarily not very practical because of its small surface area.

FIG. 2 shows a form of membrane that provides a relatively large surface area and therefore is highly effective for purposes of the present invention. The membrane of FIG. 2 is composed of a multitude of small tubular members 28 appended to and opening into a bulbous chamber 30. In this form of membrane, electrolyte 22 fills each of the small tubular members 28, and chamber 30 acts as a reservoir into which conductor 18 depends. Numerous other forms and arrangements of membrane 24 may be employed to achieve the desired end of a large effective surface area contacting the molten salt bath.

In operation, an electrical current generated from source 14 flows between cathode 16 and anode 12 by ion transfer within the salt bath in well-known manner. Thus, nitrate ions ($NO_3^-$) migrate to anode 12 while positive ions, in this case sodium and potassium ions, migrate to cathode 16. As the latter reach membrane 24, they enter into the membrane and diffuse therethrough. At the same time, alkali metal ions from the membrane glass diffuse out of the glass and are gathered by the electrolyte contained within the membrane. It is apparent then that the efficiency of sodium removal, that is, the amount of sodium ions removed relative to the amount of potassium ions removed, is dependent on the relative mobilities of sodium and potassium ions within glass membrane 24. This relationship is the ionic mobility ratio referred to earlier, and a characteristic feature of the glass employed.

It has been determined that potassium and sodium ions move through a glass with characteristic mobilities $u_{Na}$ and $u_K$, respectively, and that the ratio of these mobilities, $$B = \frac{u_{Na}}{u_K}$$

is essentially independent of composition. By treating both the glass and salt mixtures as thermodynamically ideal, the ratio of concentrations of sodium and potassium in the glass surface is dependent on B, on the salt composition, and on the membrane selectivity constant $k$ according to the formula, $$\frac{N_{Na}}{N_K} = \frac{B n_{Na}}{k n_K}$$

where N is the mole fraction of each ion in the glass and $n$ is the mole fraction of each ion in the salt bath. The transference number of each ion, that is, the fraction of the current carried by that ion through the glass, is given in general by, $$t_i = \frac{N_i u_i}{\sum_i N_i u_i}$$

so that $$t_{Na} = \frac{B^2 n_{Na}}{k + n_{Na}(B^2 - k)}$$

It is readily apparent then that the relative mobilities, and their ratio, may be easily determined from measurements of current readings during the process, weight changes in the cathode and/or the membrane glass thereof, once the permeability ratio $k$ is known. Such measurements are of a routine nature and may be readily made to determine the suitability of any particular glass for use in carrying out the invention.

One suitable glass commercially available is a borosilicate glass composed essentially of 80% $SiO_2$, 4% $Na_2O$, 12% $B_2O_3$ and 4% $R_2O_3$, primarily $Al_2O_3$. This glass is available as Corning Code No. 7740. Several lithia-containing glasses have also been found to have relatively high electrical conductivity and other particularly suitable characteristics for present purposes. One such glass is composed essentially of 68% $SiO_2$, 26% $Al_2O_3$, 5% $Li_2O$ and 1% $TiO_2$. It is also contemplated that glass-ceramic materials, in particular glass-ceramic materials containing a lithia crystal phase, may be employed for purposes of the invention. Therefore, the term glass is used in this application in the broad sense to include both glasses and glass-ceramic materials produced therefrom.

By way of further illustrating the invention, reference is made to specific measurements made on the borosilicate glass referred to above, and to the description of a practical operation employing such glass as membrane 24. The ratio of sodium ion mobility to potassium ion mobility in a membrane of this glass was determined over a range of temperature from 235°–465° C. Mobility ratio values were calculated by means of glass analyses, as well as weight change measurements in the manner described above. These values are plotted against temperature in FIG. 3 of the drawing. It will be seen from the graphical illustration of FIG. 3 that the ionic mobility ratio increases as a logarithmic function of temperature. Specifically, a plot of log B against 1000/T (° K.) is a straight line function. As pointed out earlier, this discovery is of fundamental significance in continuous purification of molten salt baths operating at temperatures in the region of 500–600° C.

Practical operation of the system is illustrated by reference to a typical system in which a 1000 pound bath of potassium nitrate is employed for ion exchange treatment of glass articles at an operating temperature of 500° C. The bath is assumed to contain 2.5% by weight of sodium nitrate as a contaminant, and it is desired to reduce this level of sodium nitrate to 0.5% by weight. Such a batch operation is selected only for purposes of illustration, it being appreciated that the normal procedure will involve continuous removal of sodium ion to maintain the impurity level at some accepted value, for example 0.5% by weight.

In the illustrative example selected, it is necessary then to remove 107 moles of $NaNO_3$ in order to reduce the sodium nitrate level by the desired amount. In the first instance, a glass membrane 22 in the form of a 30 mm. diameter sphere having a 0.2 mm. wall thickness is considered. The specific conductivity of the glass at 500° C. is $10^{-4}$ ohm$^{-1}$ cm.$^{-1}$ and the glass has an ionic mobility ratio of approximately 1000. Under these conditions, calculation shows that approximately 0.95 mole of sodium and 0.05 mole of potassium are removed for every 96,500 coulombs of current that passes. Typically, the system is designed to draw about 1 ampere of current at a potential of 7 volts. Under these conditions, a period of 126 days is required to achieve the desired sodium ion removal.

While technically feasible, such a long period of time is obviously impractical. If the surface area of the glass is increased 100-fold, as by employing a membrane such as illustrated in FIG. 2, the desired ion removal may take place in about 30 hours. With a glass having a higher specific conductivity and/or a higher selectivity for sodium ion, that is, a higher ionic mobility ratio in favor of sodium, a still shorter time could be employed. Thus, it is apparent that a practical means of removing sodium ion impurity from a molten potassium salt bath is provided.

Although this invention has been described in extensive detail with reference to removing sodium ion contamination from a bath of molten potassium salt, it will readily be appreciated that the method disclosed is equally operable with other monovalent ion pairs. For example, lithium ions can be removed from a bath of molten potassium salt in the manner disclosed above utilizing the same glass membranes as are effective in the sodium ion-potassium ion electrolysis. Where it is desired to remove contaminating lithium ions from a bath of molten sodium salt, such can be accomplished by electrolyzing the lithium ions into a glass membrane having a substantially greater ion mobility for lithium ions than for sodium ions. The composition of one glass exhibiting a ratio of lithium ion mobility relative to sodium ion mobility greater than 500 is tabulated below, in weight percent on the oxide basis.

| | Percent |
|---|---|
| $SiO_2$ | 56.1 |
| $Al_2O_3$ | 34.9 |
| $Li_2O$ | 8.5 |
| $As_2O_3$ | 0.5 |

The choice of proper glass compositions having the necessary relative ion mobility with respect to the impurity ion and primary ion concentrations is believed to be well within the technical capability of a person of ordinary skill in the art.

It will be understood of course that numerous variations and modifications are contemplated within the scope of the invention as hereafter defined. In particular, the process may be either intermittent or continuous. Further, it may be carried out within the salt bath during operation of the bath with the aid of a stirrer to circulate the molten salt if desired. Alternatively, the molten salt may be continuously pumped out of a tank into a smaller chamber for continuous treatment, or batch treatment, if desired.

I claim:
1. A method for purifying a bath composed of a molten salt of a relatively large monovalent metal ion but also containing as an impurity a minor amount of a relatively small monovalent metal ion which comprises:
   (a) establishing an electrolytic system in contact with said bath consisting of an anode, a cathode, and a source of direct current therebetween;
   (b) enclosing said cathode within a glass membrane having an electrical conductivity of at least $10^{-4}$ ohm$^{-1}$ cm.$^{-1}$ and an ion mobility for said smaller monovalent metal ion that is at least 500 times greater than the ion mobility for said large monovalent ion; and then
   (c) passing a direct current between said anode and cathode while said bath is at an elevated temperature but below the strain point of said glass membrane to cause said small monovalent metal ions to diffuse through the membrane to the cathode and thereby be removed from the bath.

2. A method for purifying a bath according to claim 1 wherein said small monovalent metal ion is sodium and said large monovalent metal ion is potassium.

3. A method for purifying a bath according to claim 1 wherein said impurity ion is introduced into the salt bath during the process of chemically strengthening a glass article through an exchange of relatively large monovalent metal ions from the bath with relatively small monovalent metal ions from the glass surface, said exchange being carried out at an elevated temperature below the strain point of the glass and said impurity ion being the relatively small monovalent metal ion.

4. A method for purifying a bath according to claim 3 wherein the removal of said small monovalent metal ions from the bath is continuous and is concurrent with the chemical strengthening process wherein the said impurity ion is introduced into the salt bath.

References Cited
UNITED STATES PATENTS

| 1,235,202 | 7/1917 | Hartsuch | 204—130 |
| 2,782,156 | 2/1957 | Raynes | 204—130 X |
| 3,183,051 | 5/1965 | Schmidt | 204—180 X |
| 3,324,013 | 6/1967 | Dewing | 204—195 X |
| 3,486,995 | 12/1969 | Evers | 204—130 |
| 2,198,733 | 4/1940 | Leibig et al. | 204—243 X |

JOHN H. MACK, Primary Examiner

A. C. PRESCOTT, Assistant Examiner

U.S. Cl. X.R.

65—30; 204—130